United States Patent
Shimizu et al.

(10) Patent No.: US 6,173,890 B1
(45) Date of Patent: Jan. 16, 2001

(54) INFORMATION RECORDING MEDIUM AND INFORMATION TRANSMISSION METHOD USING THE INFORMATION RECORDING MEDIUM

(75) Inventors: Kazuo Shimizu, Hachioji; Yoshikazu Akamine, Kitatsuru-gun, both of (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/300,310

(22) Filed: Apr. 27, 1999

(30) Foreign Application Priority Data

May 8, 1998 (JP) .................................................. 10-125913

(51) Int. Cl.[7] .................................................. G06K 17/00
(52) U.S. Cl. ...................................... 235/375; 235/472.01
(58) Field of Search ................................ 235/375, 472.01

(56) References Cited

U.S. PATENT DOCUMENTS 5,866,895  2/1999  Fukuda et al. .
5,950,173  * 9/1999  Perkowski ............................ 235/375

FOREIGN PATENT DOCUMENTS 0 717 398 A2  6/1996  (EP) .
6-78084       3/1994  (JP) .
3003812       8/1994  (JP) .
3012148       4/1995  (JP) .
7-38205       4/1995  (JP) .

* cited by examiner

Primary Examiner—Harold I. Pitts
(74) Attorney, Agent, or Firm—Frishauf, Holtz, Goodman, Langer & Chick, P.C.

(57) ABSTRACT

An information recording medium comprises a commodity image portion representative of each commodity by an image, a commodity selectively designating dot code including a tone signal corresponding to commodity designation information for individually selectively designating each commodity, a control information inputting dot code including a tone signal corresponding to information regarding various operation for designating start or cancel of ordering the commodity to a recipient by an originator, and a quantity information inputting dot code including a tone signal corresponding to quantity information for designating quantity of the commodities to be ordered and printed on a commodity catalog. When its orderer manually scans the respective dot codes by a dot code reading device to optically read them, the dot code reading device transmits the tone signals on the basis of the read dot codes from a telephone recording and reproducing adapter to a personal computer of a recipient side through a telephone line.

14 Claims, 6 Drawing Sheets

CONTENT OF RECORD; BY DIAL TONES
[*2 *2 12 71 33 23 04 11 12 41 12]

CHARACTER AND ILLUSTRATION REPRESENTATIVE OF CORRESPONDING CONTROL CONTENT

INFORMATION RECORDING MEDIUM AND INFORMATION TRANSMISSION METHOD USING THE INFORMATION RECORDING MEDIUM

BACKGROUND OF THE INVENTION

This invention relates to an information recording medium having a portion print recorded with a tone signal as a code image to be converted into the tone signal in which a predetermined information including a single of a numeral, character or various symbol or its combination is used as a dial signal of a telephone set and the converted tone signal can be optically read and an information transmission method using the information recording medium.

Heretofore, there has been known a catalog mail order selling in which an originator (orderer) orders to purchase a desired commodity to a recipient (order acceptor) by referring a commodity catalog describing and displaying a photograph and a description of many types of various commodities. In such a catalog mail order selling, transmission of order instruction from the originator to the acceptor has solely been executed by a mailing method. However, in the mailing method, the originator must fill out a predetermined form sheet with information such as a commodity number, etc. to be ordered at each time in the case of ordering. Accordingly, its ordering work is troublesome. If the number of commodities to be ordered is increased, there are inconveniences of easy occurrence of fill-out mistakes as much.

Recently, there appears a mail order selling ordering and accepting system which utilizes a telephone, a facsimile or so-called a personal computer communication, etc. to eliminate the above-mentioned inconveniences. However, there is still a room for improving certainty at the time of transmitting an order instruction from an originator to an order acceptor or operational easiness, etc. of an apparatus.

On the other hand, as disclosed in Japanese Patent Application KOKAI Publication No. 6-78084, there is known a catalog mail order selling ordering and accepting system in which a bar code capable of being optically read corresponding to a commodity number for designating a commodity is print recorded together with each commodity on a commodity catalog and an originator makes a predetermined reader read the bar code to thereby transmit an order designation from the originator to the order acceptor. That is, the originator makes the predetermined reader optically read the bar code corresponding to a desired commodity from a commodity group described on the commodity catalog, recovers the original commodity number by the reader, further converts the recovered commodity number into a tone signal having a combination of two sound frequencies of a high group (1209 Hz, 1336 Hz and 1477 Hz) and a low group (697 Hz, 770 Hz, 852 Hz and 941 Hz) used at the time of transmitting the telephone number to an exchange by a converter, and then transmits the tone signal to the recipient through a telephone channel. And, the recipient obtains the original commodity number from the received tone signal, specifies the commodity corresponding to the commodity number, and sends the specified commodity.

According to such a system, as a result of improving the certainty at the time of transmitting the order instruction and the operational easiness, the commodity ordering and order accepting work can be further easily executed and contribute to spread of the catalog main order selling.

However, in the catalog mail order selling ordering and order accepting system using the above-mentioned bar code, a recording capacity of the bar code itself is fundamentally small. Hence, it is substantially impossible to directly record the sound signal. And, the telephone number or the commodity number cannot be directly recorded in the form of the tone signal on a form sheet surface. Therefore, the originator further needs a converting device for converting data corresponding to the telephone number or the commodity number read out from the bar code into the above-mentioned tone signal.

The inventors of the present invention have had various discussions by obtaining fundamental knowledge that the ordering work can be extremely efficiently and effectively executed if the sound signal can be directly print recorded in the form capable of being optically read on a printing medium such as a form sheet because of a predetermined limit in the catalog mail order selling ordering and order accepting system of this type utilizing the conventional bar code to further improve the system, and has completed the present invention.

BRIEF SUMMARY OF THE INVENTION

Accordingly, it is an object of the present invention to provide an information recording medium having a portion print recorded with a tone signal as a code image to be converted into the tone signal in which a predetermined information including a single of a numeral, character or various symbol or its combination is used as a dial signal of a telephone set and the converted tone signal can be optical read and an information transmission method using the information recording medium.

According to an aspect of the present invention, there is provided an information recording medium, comprising:
a portion recorded with a predetermined information to be transmitted through a telephone line as a code image to be optically read, the predetermined information being converted into a tone signal having a combination of two sound frequencies of a high frequency group and a low frequency group used to transmit a recipient's telephone number by an originator and being recorded as the code image corresponding to the converted tone signal; and
a portion recorded with at least one of numerals, characters and symbols representative of a content of the predetermined information.

According to another aspect of the present invention, there is provided an information transmission method, comprising the steps of:
optically reading a code image on an information recording medium, the code image including a predetermined information including at least one of numeral, character and symbol to be transmitted through a telephone line, the predetermined information being converted into a tone signal having a combination of two sound frequencies of a high frequency group and a low frequency group used to transmit a recipient's telephone number by an originator and being recorded as the code image corresponding to the converted tone signal;
recovering the tone signal from the optically read code image; and
transmitting the predetermined information by outputting the recovered tone signal to the telephone line.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE INVENTION

First, before embodiments of the present invention will be described, examples of a code image and a code image reader to be applied to the present invention will be simply described.

As examples of the most preferable code image and code image reader, there is listed a dot code and a dot code reading device which manually scans and optically reads the dot code, and reproduces to output information such as an original sound information, etc. which has been already proposed as EP 0,717,398 A2 (corresponding to U.S. Pat. No. 5,866,895) by the assignee of the present invention.

Figure 1:
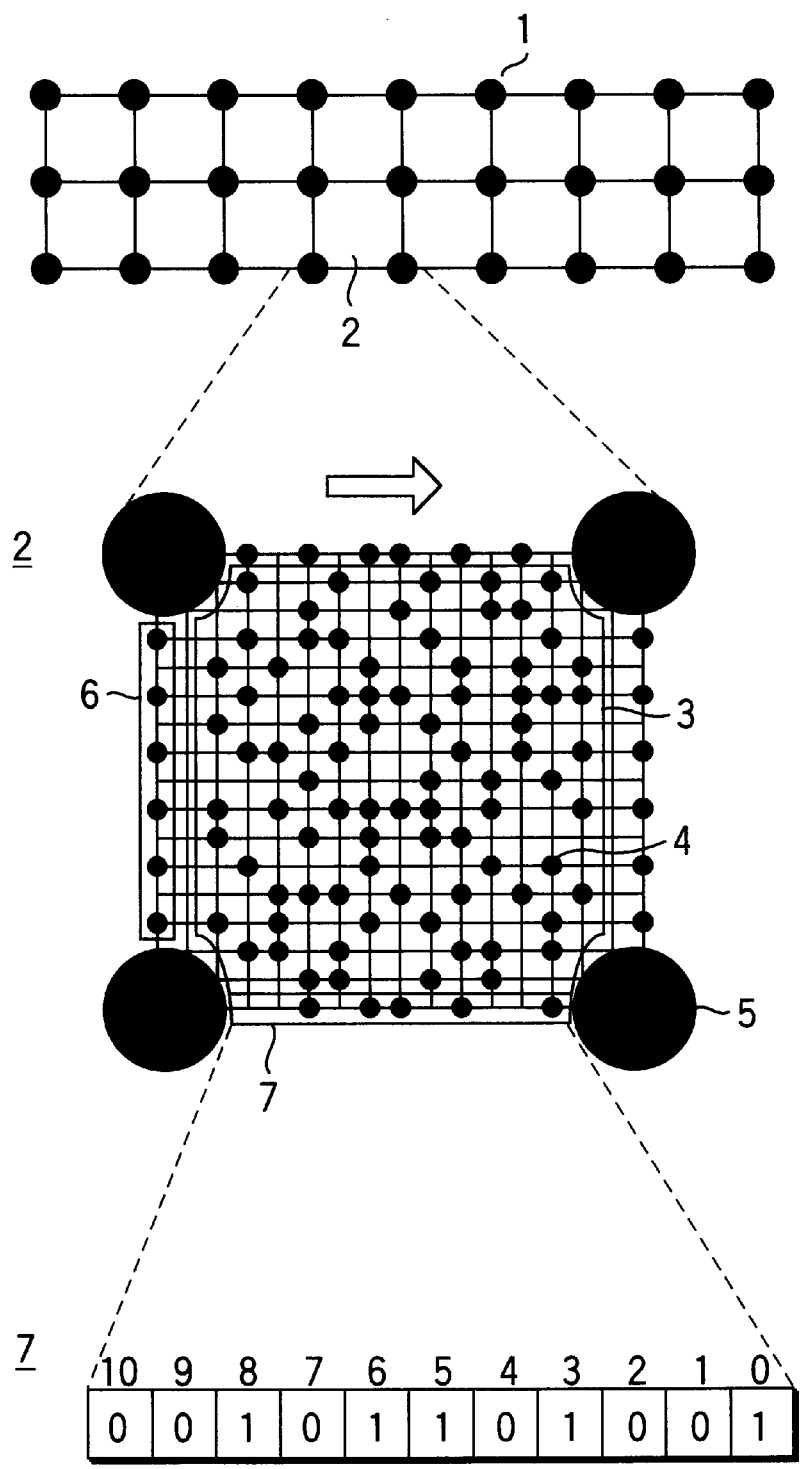
FIG. 1 is a diagram showing a configuration of a physical format of a conventional dot code applicable to the present invention.

FIG. 1 shows a configuration of a physical format of the dot code 1.

The dot code 1 is constituted by adjacently arranging a plurality of blocks 2 in a two-dimensional manner. The blocks 2 each has data areas 3 each existing in a predetermined arranging form as a dot image of a white dot or black dot corresponding to "0" or "1" (since the white dot has the same color as the sheet surface, it does not exist as the form of the dot) in which data divided at each block of the data relating to a tone signal to be converted from a predetermined information formed of a single of a numeral, character, various symbol or a combination thereof to be transmitted through a telephone channel, markers 5 having predetermined continuous number of blacks disposed at four corners of the respective blocks 2 to be used to find a reference point for detecting dots (data dots) 4 of the data area 3, a matching dot pattern portion 6 located between the markers 5, and a block address pattern 7 disposed between the markers 5 to identify at the time of reading the plurality of different blocks 2 and including an error detection or error correction symbol. In FIG. 1, lines drawn in a lattice state in the block are virtual lines.

Figure 2:
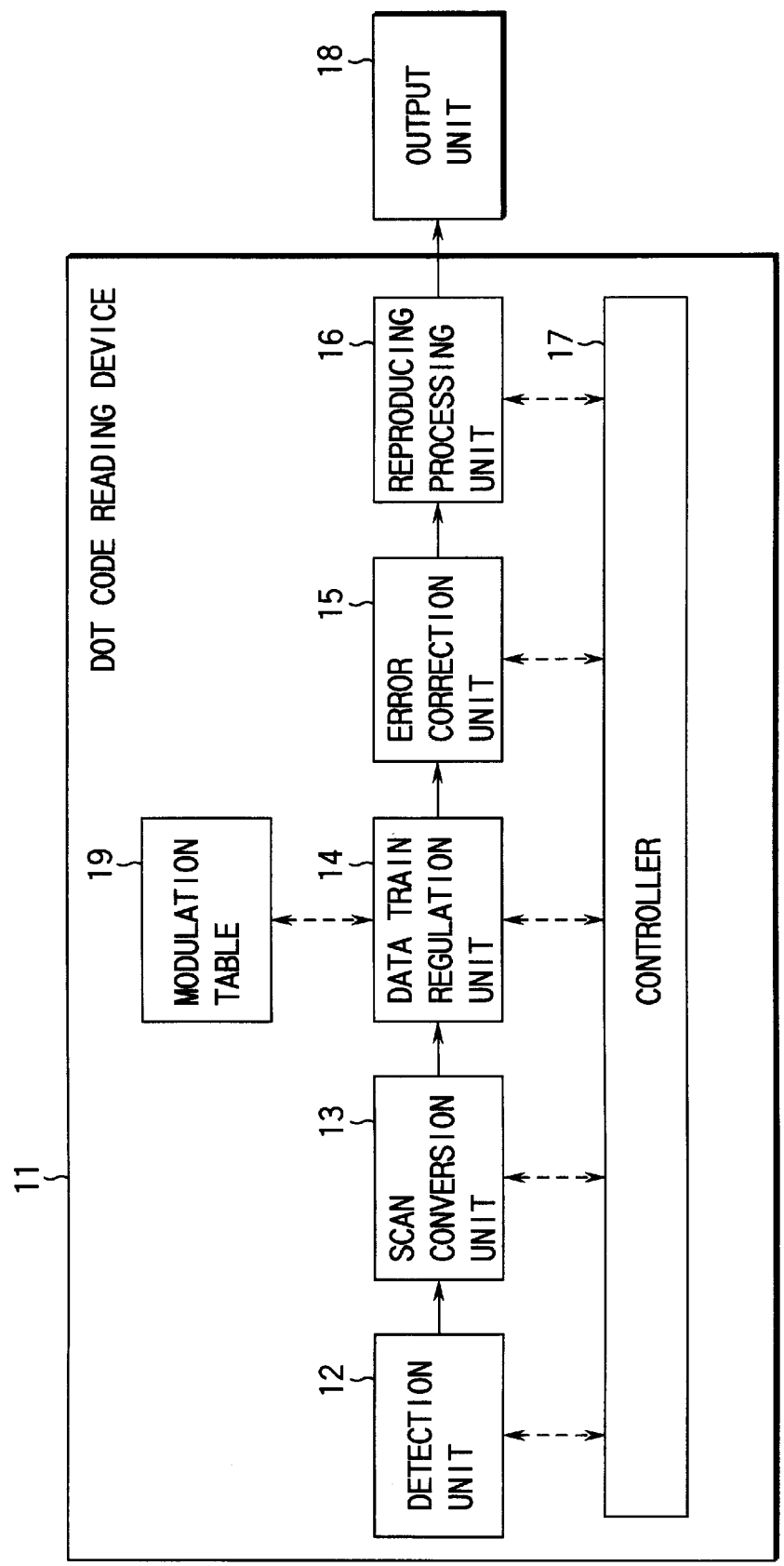
FIG. 2 is a block diagram showing the functional block arrangement of a conventional dot code reading device applicable to the present invention.

FIG. 2 shows a functional block arrangement of a dot code reading device 11 for optically reading out such dot code 1 by manually scanning it.

The dot code reading device 11 comprises a detection unit 12, a scan conversion unit 13, a data train regulation unit 14, an error correction unit 15, a reproducing processing unit 16 and a controller 17. The detection unit 12 includes an imaging unit such as a CCD, etc., for imaging the dot cod 1 of FIG. 1 print recorded on a sheet-like recording medium such as paper, etc. The scan conversion unit 13 recognizes image data supplied from the detection unit 12 as a dot code image, normalizes it, and outputs it as data of corresponding "0" or "1" from the dot image of its white dot or black dot. The data train regulation unit 14 regulates the data train output from the scan conversion unit 13, and demodulates the data train by referring to a modulation table 19. The error correction unit 15 corrects reading error or data error of the data output from the data train regulation unit 14 at the time of reproducing the data. The reproducing processing unit 16 elongates compressed data output from the error correction unit 15. And, the controller 17 controls the respective units and the overall dot code reading device 11. The sound (tone signal) processed by the reproducing processing unit 16 is output from the output unit 18 such as a speaker, etc.

The above-mentioned dot code image is successively imaged by bringing the imaging unit of the dot code reading device 11 into contact with the dot code 1 and manually moving the dot code reading device 11 in a direction of an arrow in FIG. 1. At this time, even if its imaging range is only a part of the dot code 1, if the overall dot code can be divided and imaged as a result by moving the dot code reading device 11, it is allowed. To accurately obtain a position of the dot 4, first, the markers 5 as reference positions are detected from the respective images imaged over a plurality of frames by manual scanning. The markers 5 are detected by utilizing the feature of the large dot size from the image imaged by the imaging unit of the detection unit 11. Thereafter, the matching dot pattern portion 6 disposed between the markers 5 is searched, and coordinates of the centroid of each isolated dot in the matching dot pattern portion 6 are obtained. The reading reference points (a true center of each marker 5) for deciding a reading point of each dot 4 in the data area 3 are obtained from the coordinates of the centroids by using, for example, a least squares method, and the reading point of each dot 4 is obtained on the basis of the reading reference points.

As a result, in the dot code 1 comprised of the above-mentioned physical format configuration, even if a size of an imaging visual field of the dot code reading device 11 is smaller than a size of the overall dot code 1, that is, even if the dot code 1 cannot be read upon one shot by a solid imaging element such as a CCD, etc. in the dot code reading device 11, if each address (block address pattern 7) fed to the block 2 can be read and recognized at each block, data of the block 2 are gathered from the address, and hence original data can be reconstituted. Accordingly, a large quantity of data which cannot be realized with the bar code of one-dimensional or two-dimensional shape which has heretofore been known can be held on the sheet surface. Therefore, transmission of sound information with paper used as a medium can be lightly and economically realized.

Embodiments of an information recording medium and an information transmission method using the information recording medium according to the present invention utilizing the dot code 1 and dot code reading device 11 as described above will be described in detail.

First Embodiment

Figure 3:
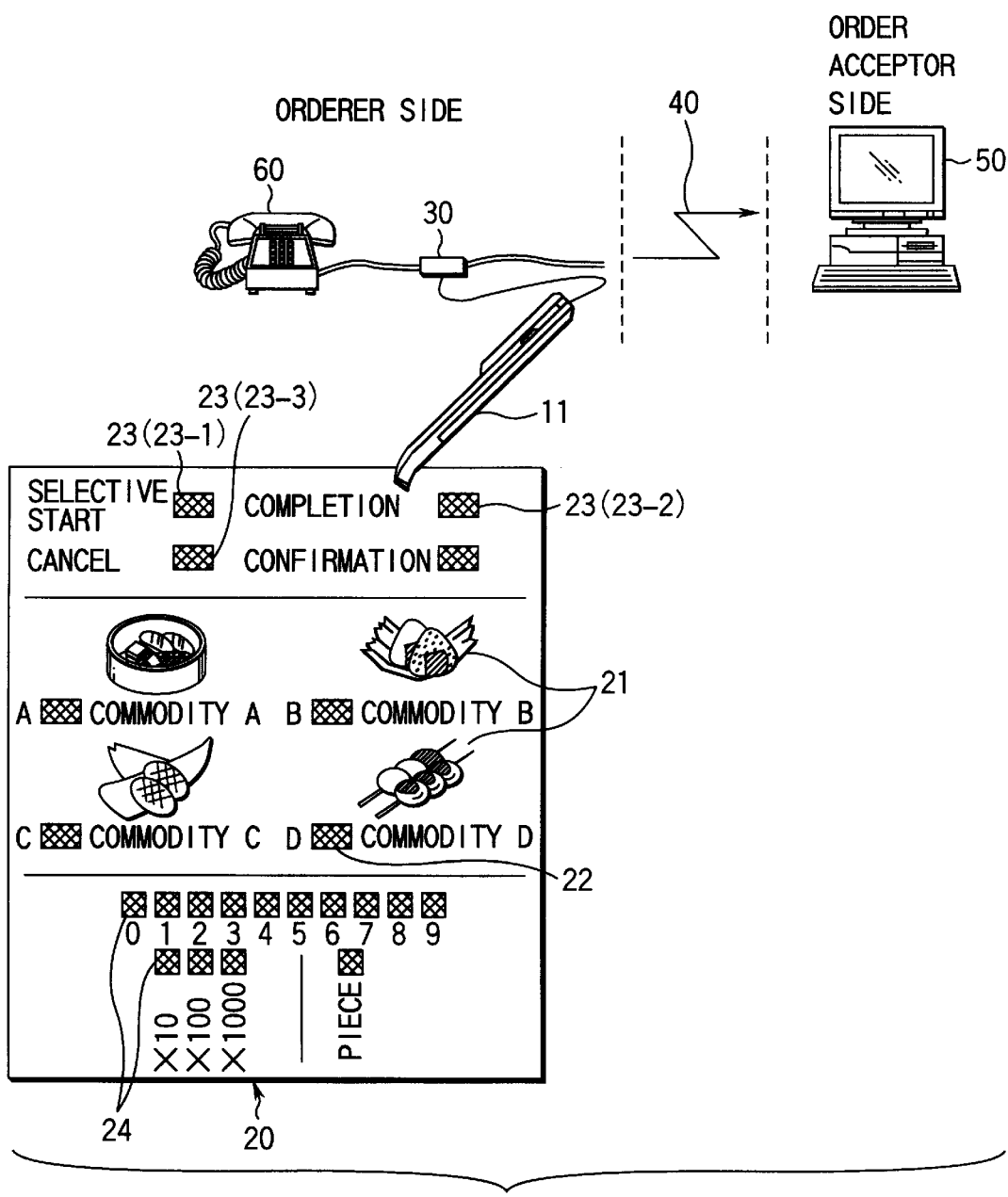
FIG. 3 is a diagram showing the constitution example of a commodity catalog according to a first embodiment of an information recording medium of the present invention and a catalog mail order selling ordering and order accepting system as an instance of a system applied by an information transmission method according to the present invention.

FIG. 3 shows an example of application of a commodity catalog in a catalog mail order selling ordering and order accepting system to an information recording medium of the present invention and a constitution example of the catalog mail order selling ordering and order accepting system at the time of ordering a commodity by using the commodity catalog.

As shown in FIG. 3, in the commodity catalog 20, a plurality of commodity image portions 21, a plurality of commodity selectively designating dot codes 22, a plurality of control information inputting dot codes 23 and a plurality of quantity information inputting dot codes 24 are printed.

In this case, the plurality of commodity image portions 21 respectively illustrate respective commodities A, B, C, D, . . . , as an image such as chart, picture, drawing, etc.

The plurality of commodity selectively designating dot codes 22 are respectively printed corresponding to near positions of respective commodities A, B, C, D, . . . , and include tone signals corresponding to commodity designating information such as for example, #012345A01 formed of a single of numerals, characters or various symbols or a combination thereof for individually selectively designating the respective commodities A, B, C, D, . . .

The plurality of control information inputting dot codes 23 include tone signals corresponding to information formed of a single of numerals, characters or various symbols or a combination thereof relating to various operations for designating start, cancel, end and conformation of ordering the commodity to be ordered from an orderer to order acceptor.

And, the quantity information inputting dot codes 24 includes tone signals corresponding to quality information formed of a single of numerals, characters or various symbols or a combination thereof for designating quantity, etc. of the commodities to be ordered.

In this case, in a selectively starting dot code 23-1 for designating start of ordering a commodity of one of the control information inputting dot codes 23, a telephone number of the acceptor of an opponent for ordering the commodity is previously recorded as a tone signal. Accordingly, it is devised to more simply execute an ordering work to the acceptor by the orderer without mistake.

A dot code reading device 11 for manually scanning and optically reading the dot codes 22, 23 or 24 on the commodity catalog 20 has the same arrangement as the dot code reading device 11 shown in FIG. 2. The tone signal on the basis of the dot code read by the dot code reading device 11 is output from the dot code reading device 11, and transmitted to a personal computer 50 of the acceptor side through a telephone line 40 by a telephone recording/reproducing adapter 30.

The telephone recording/reproducing adapter 30 has a function for transmitting an ordinary tone signal dispatched from the push-phone telephone set 60 and the tone signal on the basis of the dot code read by the dot code reading device 11. And, on the contrary, the tone signal on the basis of the dot code read by the dot code reading device 11 can be monitored by using the speaker of the push-phone telephone set 60.

Figure 4:
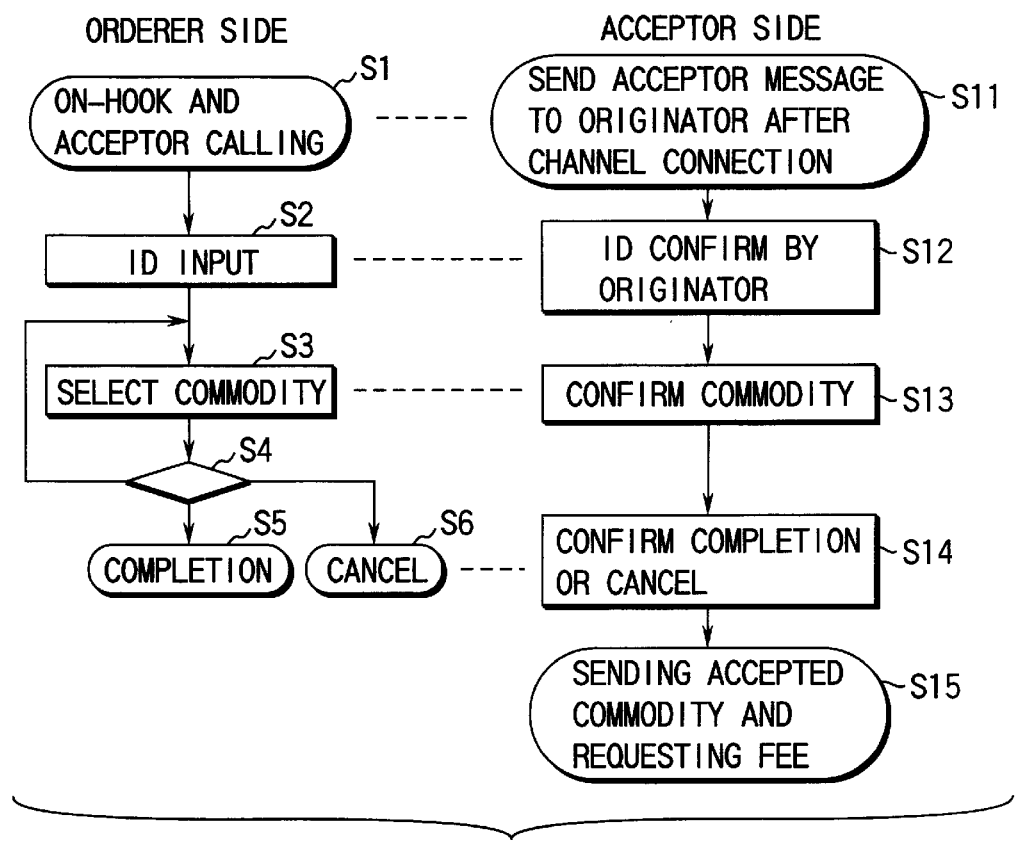
FIG. 4 is a flowchart for explaining an operational sequence of the catalog mail order selling ordering and order accepting system shown in FIG. 3.

An operational sequence of actually ordering a commodity to an acceptor by using the commodity catalog 20 as described above will be explained on the basis of the flowchart shown in FIG. 4.

First, when the orderer decides a desired commodity by the commodity catalog 20, the orderer sets the push-phone telephone set 60 to an on-hook state to set the telephone line 40 to a connective state and to the acceptance waiting state of a tone signal. And, the orderer initially manually scans the selectively starting dot code 23-1 on the commodity catalog 20 by the dot code reading device 11 to optically read it. At this time, since a telephone number of the acceptor is previously recorded as a tone signal in the selectively starting dot code 23-1, a tone signal similar to the tone signal dispatched in the case of calling from the push-phone telephone set 60 is output from the dot code reading device 11. The orderer can call a telephone to the acceptor by the output tone signal (step S1).

The personal computer 50 of the acceptor side is channel-connected to the orderer in response to the orderer's calling. Thereafter, the acceptor transmits a response message to the originator (step S11). Accordingly, the orderer confirms the response message sent from the acceptor side by the push-phone telephone set 60, and can confirm that the ordering destination of the commodity is not mistaken.

Then, the orderer transmits an ID information for simply specifying the own intending to order the commodity at the acceptor side to the acceptor side as a tone signal (step S2). This ID information can be variously considered, for example, as a method for directly inputting it from the push-phone telephone set 60 or a method in which an orderer previously registers his own telephone number with the acceptor side and at the time of calling by the orderer, the acceptor automatically recognizes the telephone number so that the telephone number is used as a user ID information, etc.

The acceptor receives the tone signal on the basis of the ID information, obtains user ID information (for instance, number of 012-345-6789, etc.) and immediately designates the orderer (step S12).

And, the orderer selects and reads the commodity selectively designating dot codes 22 corresponding to the desired commodity on the commodity catalog 20, thereby designating the commodity to be ordered (step S3).

The acceptor receives commodity designation information on the basis of the read commodity selectively designating dot codes 22, and confirms the ordered commodity (step S13).

And, the orderer decides whether a commodity order is further executed or not (step S4). In the case of further ordering the commodity, the flow is returned to the step S3, and the similar operation is executed. On the contrary, in the case not further ordering a commodity, the flow is transferred to a step S5. In this case, a completion dot code 23-2 of one of the control information inputting dot codes 23 is manually scanned by the dot code reading device 11, and optically read. And, a signal of ordering completion is sent to the acceptor side. Further, if the commodity order so far is desired to be cancelled, the flow is transferred to a step S6. In this case, a cancel dot code 23-3 of one of the control information inputting dot codes 23 is manually scanned by the dot code reading device 11, and optically read. In this case, a cancel signal is sent to the acceptor side. In this case, even if the cancel signal is not always sent to the acceptor, it is possible that, if a signal of an ordering completion is not sent to the acceptor side, it is automatically handled at the acceptor side as cancel of the commodity ordering. In this case, uncertain case of orderer's will due to an orderer's mischief or an incidental accident of a telephone such as, for example, a disconnection fault of a telephone channel can be dealt with.

The acceptor receives a signal of ordering completion or cancel signal on the basis of the read control information inputting dot codes 23 (step S14), and enters a sending work or the accepted commodity or a work of requesting a fee (step S15).

In the commodity selectively designating dot codes 22, except the above-mentioned commodity designation information, commodity sound information or commodity display information for aurally or visually confirming the selectively designated commodity by the originator can be further contained in the same commodity selectively designating dot codes 22.

Figure 5:
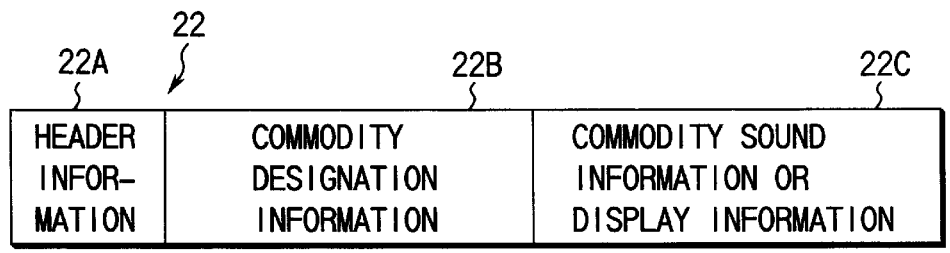
FIG. 5 is a diagram showing a data configuration example of a dot code for selectively designating a commodity.

As shown in FIG. 5, data configuration of the commodity selectively designating dot codes 22 includes a header information 22A, a commodity designation information 22B formed as a tone signal, and a commodity sound information or display information 22C. And, when the orderer reads the commodity selectively designating dot codes 22, the commodity designation information 22B of the selected commodity is sent to the acceptor side, and information of a sound, character or image, etc. for describing the selected commodity recorded as the commodity sound information or display information 22C is immediately output from the output unit 18 (speaker, image display unit, etc.). Accordingly, the orderer can confirm at the place that the read code image is certainly a code image corresponding to the desired commodity, and can execute an ordering work with safety.

It is noted that a privilege information capable of being known only by the orderer only after the orderer's actual order of the commodity may be further added to the commodity selectively designating dot codes 22, or in addition, various information can be added.

Figure 6:
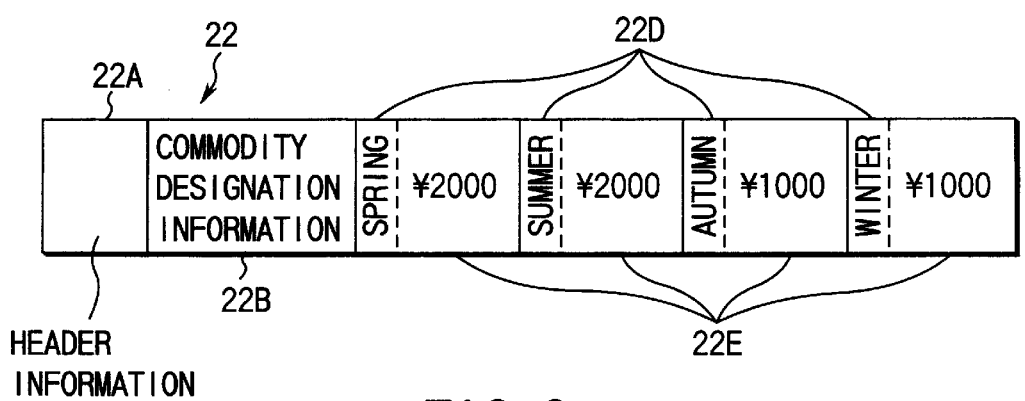
FIG. 6 is a diagram showing another data configuration example of the dot code for selectively designating a commodity.

In the commodity selectively designating dot codes 22, except the commodity designation information 22B, time and season information representative of a plurality of different times (time information, etc., representative of a.m. or p.m.) to season (spring, summer, autumn and winter), and a plurality of commodity attribute information set at the plurality of the time and season information at respective commodities selectively designated by the commodity designation information 22B (price, shape, size, color, quantity and various performances, etc. of the commodity, price of the commodity is shown in FIG. 6) can be contained in the commodity selectively designating dot codes 22.

As shown in FIG. 6, data configuration of the commodity selectively designating dot codes 22 includes a header information 22A, a commodity designation information 22B formed as a tone signal, and a set information of time and season information 22D and commodity attribute information 22E. When the orderer reads the commodity selectively designating dot codes 22, the commodity designation information 22B of the selected commodity is sent to the acceptor side, and information of sound and image for describing the price of the commodity corresponding at the time of ordering are immediately output from the output unit 18 (speaker, image display unit, etc.). This is executed in such a manner that the reproducing processing unit 16 of the dot code reading device 11 extracts the set information of the time and season information 22D and the commodity attribute information 22E from the data error corrected and outputs it to the user. In this case, in the case of extracting the set information, a time and season at the time of ordering from the timer contained in the controller 17 are detected, and the corresponding set information is extracted.

According to the commodity selectively designating dot codes 22 as shown in FIG. 6, the commodity attribute information (price, shape, size, color, various performances, etc., of the commodity) corresponding to the time and season (time and season) at the time of ordering can be automatically selected from the plurality of the commodity attribute information 22E, the orderer can devote himself to the ordering work without being conscious of the time and season at the time of ordering at each time. And the acceptor can be set free from the troublesomeness of updating the commodity catalog at each time and season.

Second Embodiment

In the first embodiment, adoption of a method for directly inputting ID information from a push-phone telephone set 60 to a user ID information or a method in which an orderer previously registers his own telephone number with the acceptor side and at the time of calling by the orderer, the acceptor automatically recognizes the telephone number so that the telephone number is used as a user ID information, has been described in the foregoing explanation. However, this ID information may be input by reading the code image.

Figure 7:
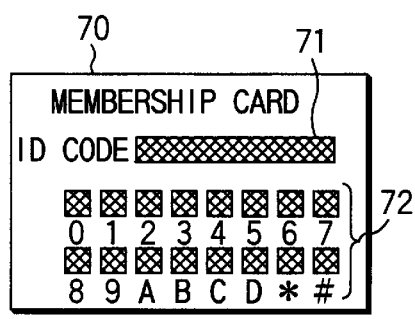
FIG. 7 is a diagram showing a membership card according to a second embodiment of an information recording medium of the present invention.

As shown in FIG. 7, in the information recording medium according to the second embodiment of the present invention, a membership card 70 as an information recording medium is previously distributed separately. In this membership card 70, a tone signal corresponding to ID information is print recorded as an ID code 71. Accordingly, the orderer manually scans the ID code 71 by a dot code reading device 11, optically reads it, and transmits it as the tone signal to the acceptor side.

In this case, a reference symbol 72 in FIG. 7 is a code image group of a number or symbol prepared to input the user ID information to the dot code reading device 11 one by one so that a child may not liberate for reading the ID code 71 by the dot code reading device 11 to order the commodity.

Third Embodiment

In the present invention, embodiments of an information recording medium shown as below are contained except the above-mentioned embodiments.

Figure 8A:
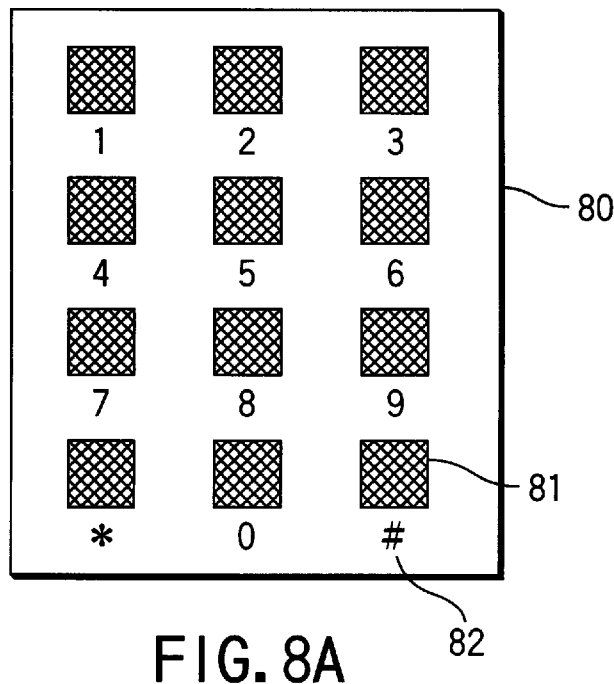
FIG. 8A is a diagram showing an information recording medium in which a code image is print recorded in a positional relationship similar to a pushbutton of a telephone set on a sheet surface according to a third embodiment of an information recording medium of the present invention.

As shown in FIG. 8A, the information recording medium according to one aspect of the third embodiment comprises a code image 81 including a tone signal corresponding to a number or symbol in a pushbutton of a telephone set and print recorded on a sheet surface 80 together with a corresponding tone symbol 82 according to the same positional relationship as disposition of the pushbutton.

Figure 8B:
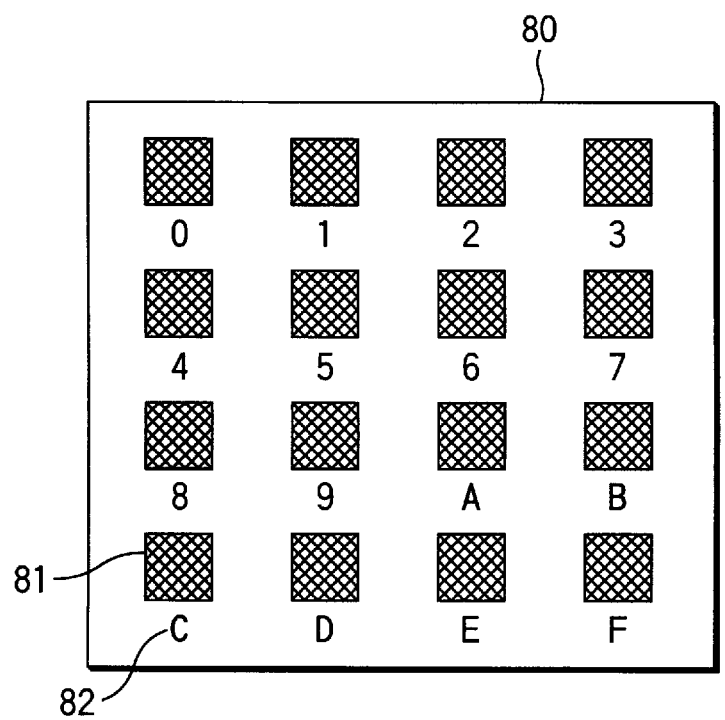
FIG. 8B is a diagram showing another example of an information recording medium in which a code image is print recorded in a positional relationship similar to a pushbutton of a telephone set on a sheet surface.

FIG. 8B shows an information recording medium of another aspect of the third embodiment of the present invention. The information recording medium of the aspect of the third embodiment comprises code images 81 of tone signals corresponding to numbers of "0" to "9" and alphabets of "A" to "F" used for a pushbutton type telephone set and print recorded together with corresponding tone symbols 82.

Fourth Embodiment

Figure 9:
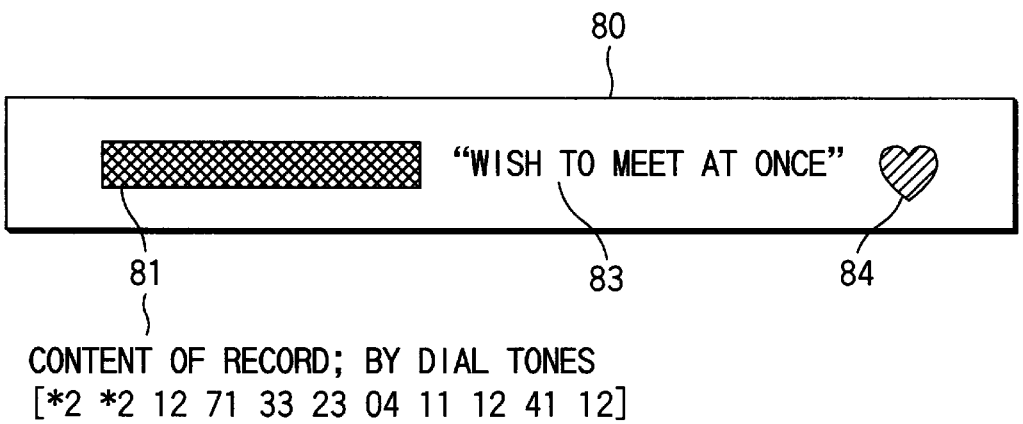
FIG. 9 is a diagram showing an example in which a code image including a tone signal to be transmitted to a pager is print recorded on a sheet surface according to a fourth embodiment of an information recording medium of the present invention.

FIG. 9 shows an information recording medium according to a fourth embodiment of the present invention. The fourth embodiment comprises a code image 81 including a tone signal corresponding to a message to be transmitted to a pager (so-called a pocket bell), characters 83 representative of a content of the code image 81 and an illustration 84 relating to the content print recorded on a sheet surface 80.

Fifth Embodiment

Figure 10:
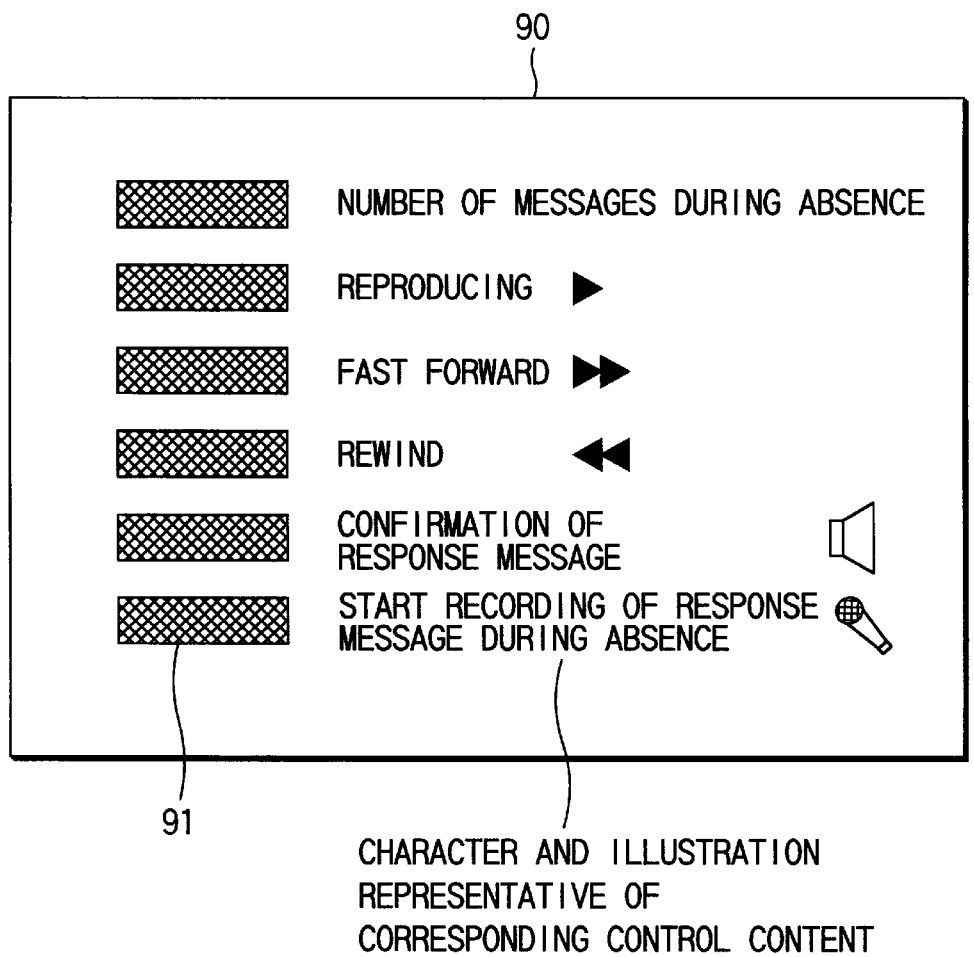
FIG. 10 is a diagram showing an example utilizing a code image as a telephone set remote control sheet according to a fifth embodiment of an information recording medium of the present invention.

FIG. 10 shows an information recording medium according to a fifth embodiment of the present invention. The fifth embodiment is a telephone set remote control sheet 90 used to confirm contents of a message to myself during my absence upon calling my own telephone answering machine by other person from a place out of my home.

In the telephone set remote control sheet 90, there are print recorded to be able to be optically read control code images 91 including a first code image including a password for identifying a person to access to the telephone set, a second code image for knowing number of calls of the telephone during absence, a third code image for designating an operation for reproducing the content of the telephone called during the absence, a fourth code image for designating a fast forwarding operation of the content of the telephone called during the absence, a fifth code image for designating a rewinding operation of the content of the telephone called during the absence, a sixth code image for confirming the content of a message responding to the telephone called during the absence, and a seventh code image for designating an operation for recording the content of the message responding to the telephone called during the absence, etc. Of course, the respective code images 91 include the respective information in the form of tone signals.

The present invention is described on the basis of the first to fifth embodiments in connection with the case where the present invention is applied to the information recording medium and the information transmission method using the information recording medium. However, it is a matter of course that the present invention is not limited only to such embodiments but can be applied to other information recording medium and the information transmission method. Here, the scope of the present invention will be summarized below.

(1) An information recording medium, comprising:
  a portion recorded with a predetermined information to be transmitted through a telephone line as a code image to be optically read, the predetermined information being converted into a tone signal having a combination of two sound frequencies of a high frequency group and a low frequency group used to transmit a recipient's telephone number by an originator and being recorded as the code image corresponding to the converted tone signal; and
  a portion recorded with at least one of numerals, characters and symbols representative of a content of the predetermined information.

According to the information recording medium, a predetermined information such as a telephone number or a commodity number, etc. including a single of the numerals, characters or various symbols or a combination thereof is converted into a tone signal and the tone signal is print recorded as a code image to be directly optically readable. Accordingly, a converter for converting data corresponding to the telephone number or the commodity number as information to be transmitted into a tone signal is eliminated at all.

Here, as the tone signal including a combination of the two sound frequencies of a high frequency group and a low frequency group, a tone signal including a combination of a high frequency group (1209 Hz, 1336 Hz and 1477 Hz) and a low frequency group (697 Hz, 770 Hz, 852 Hz and 941 Hz) used as a dial signal at the time of transmitting the telephone number to an exchange is generally used.

(2) The medium according to (1), wherein the predetermined information includes a telephone number.

According to the medium according to (2), a labor hour for newly confirming the telephone number or executing a number inputting manipulation is omitted.

(3) The medium according to (1), wherein when the information recording medium is a commodity catalog describing to display various commodities referred when the originator orders a desired commodity to the recipient,
  the predetermined information includes a commodity designation information for individually selectively designating a desired commodity from a commodity group described on the commodity catalog.

According to the medium in (3), when the information recording medium is applied to the commodity catalog in a catalog mail order selling, ordering of the commodity can be simply executed by using the telephone set merely by selectively reading the code image corresponding to the desired commodity by a predetermined reading device without necessity of the above-mentioned converter.

(4) The medium according to (1), wherein when the information recording medium is a commodity catalog describing to display various commodities referred when the originator orders a desired commodity to the recipient,
  the predetermined information includes:
  a commodity designation information for individually selectively designating a desired commodity from a commodity group described on the commodity catalog;
  time and season information representative of at least one of a plurality of times and seasons; and
  a plurality of different commodity attribute information set at each of the plurality of the time and season information of commodities selectively designated by the commodity designation information.

According to the medium in (4), when the information recording medium is applied to the commodity catalog in the catalog mail order selling, ordering of the commodity can be simply executed by using the telephone set merely by selectively reading the code image corresponding to the desired commodity by a predetermined reading device without necessity of the above-mentioned converter. Simultaneously, since the commodity attribute information corresponding to the time and season at the time of ordering (price, shape, size, color, quantity and various performances of the commodity) can be automatically selected from a plurality of the commodity attribute information, the orderer can devote himself to the ordering work without being conscious of the time and season at each time at the time of ordering, and the acceptor is set free from troublesomeness of updating the commodity catalog at each time of the time and season.

(5) The medium according to (1), wherein when the information recording medium includes a commodity catalog describing to display various commodities referred when the originator orders a desired commodity to the recipient, and an ID card recording a user ID information for specifying an originator by a recipient in the case of ordering, the predetermined information in the commodity catalog includes a commodity designation information for individually selectively designating a desired commodity from a commodity group described on the commodity catalog, and the predetermined information in the ID card includes the user ID information.

According to the medium in (5), when the information recording medium is applied to the commodity catalog in a catalog mail order selling, ordering of the commodity can be simply executed by using the telephone set merely by selectively reading the code image corresponding to the desired commodity by a predetermined reading device without necessity of the above-mentioned converter. And, a labor hour for newly confirming the user ID information or executing an inputting manipulation of the user ID information by a button is omitted.

(6) The medium according to (1), wherein when the information recording medium is a commodity catalog describing to display various commodities referred when the originator orders a desired commodity to the recipient, the predetermined information includes:

a commodity designation information for individually selectively designating a desired commodity from a commodity group described on the commodity catalog; and information relating to various operations including an operation for designating at least one of starting an order and finishing the order to be executed to order the commodity to the recipient by the originator.

According to the medium in (6), when the information recording medium is applied to the commodity catalog in a catalog mail order selling, ordering of the commodity can be simply executed by using the telephone set merely by selectively reading the code image corresponding to the desired commodity by a predetermined reading device without necessity of the above-mentioned converter. Simultaneously, an operation for ordering the commodity is simplified and an erroneous operation can be prevented.

(7) The medium according to (1), wherein when the information recording medium is a commodity catalog describing to display various commodities referred when the originator orders a desired commodity to the recipient, the predetermined information includes a commodity designation information for individually selectively designating a desired commodity from a commodity group described on the commodity catalog, and the code image further includes at least one of commodity sound information and commodity display information to confirm the commodity selectively designated by the commodity designation information of the same code image by at least one of aural and visual senses by the originator except the commodity designation information.

According to the medium in (7), when the information recording medium is applied to the commodity catalog in a catalog mail order selling, ordering of the commodity can be simply executed by using the telephone set merely by selectively reading the code image corresponding to the desired commodity by a predetermined reading device without necessity of the above-mentioned converter. And, simultaneously, since the information such as sound, character, image, etc. for describing regarding the ordered commodity is immediately output from the selected code image, the orderer can confirm the read code image at the place that the read image is certainly the code image corresponding to the desired commodity and can execute the ordering work with safety.

(8) An information transmission method, comprising the steps of:

optically reading a code image on an information recording medium, the code image including a predetermined information including at least one of numeral, character and symbol to be transmitted through a telephone line, the predetermined information being converted into a tone signal having a combination of two sound frequencies of a high frequency group and a low frequency group used to transmit a recipient's telephone number by an originator and being recorded as the code image corresponding to the converted tone signal;

recovering the tone signal from the optically read code image; and transmitting the predetermined information by outputting the recovered tone signal to the telephone line.

According to the information transmission method, a predetermined information such as a telephone number or a commodity number, etc. including a single of the numerals, characters or various symbols or a combination thereof is converted into a tone signal and the tone signal is print recorded as a code image to be directly optically readable. Accordingly, a converter for converting data corresponding to the telephone number or the commodity number as information to be transmitted into a tone signal is eliminated at all. And, data corresponding to the telephone number or commodity number as information to be transmitted can be simply transmitted merely by optically reading the code image.

(9) The method according to (8), wherein the predetermined information includes a telephone number.

According to the method according to (9), a labor hour for newly confirming the telephone number or executing a number inputting manipulation is omitted.

(10) The method according to (8), wherein when the information recording medium is a commodity catalog describing to display various commodities referred when the originator orders a desired commodity to the recipient, the predetermined information includes a commodity designation information for individually selectively designating a desired commodity from a commodity group described on the commodity catalog.

According to the method in (10), when the information recording medium is applied to the commodity catalog in a catalog mail order selling, ordering of the commodity can be simply executed by using the telephone set merely by selectively reading the code image corresponding to the desired commodity by a predetermined reading device without necessity of the above-mentioned converter.

(11) The method according to (8), wherein when the information recording medium is a commodity catalog describing to display various commodities referred when the originator orders a desired commodity to the recipient, the predetermined information includes:

a commodity designation information for individually selectively designating a desired commodity from a commodity group described on the commodity catalog;

time and season information representative of at least one of a plurality of times and seasons; and a plurality of different commodity attribute information set at each of the plurality of the time and season information of commodities selectively designated by the commodity designation information, and in the case of recovering, the attribute information corresponding to the time and season at the time of recovering is selected from a plurality of attribute information.

According to the method in (11), when the information recording medium is applied to the commodity catalog in the catalog mail order selling, ordering of the commodity can be simply executed by using the telephone set merely by selectively reading the code image corresponding to the desired commodity by a predetermined reading device without necessity of the above-mentioned converter. Simultaneously, since the commodity attribute information corresponding to the time and season at the time of ordering (price, shape, size, color, quantity and various performances of the commodity) can be automatically selected from a plurality of the commodity attribute information, the orderer can devote himself to the ordering work without being conscious of the time and season at each time at the time of ordering, and the acceptor is set free from troublesomeness of updating the commodity catalog at each time of the time and season.

(12) The method according to (8), wherein when the information recording medium includes a commodity catalog describing to display various commodities referred when the originator orders a desired commodity to the recipient, and an ID card recording a user ID information for specifying an originator by a recipient in the case of ordering, the predetermined information in the commodity catalog includes a commodity designation information for individually selectively designating a desired commodity from a commodity group described on the commodity catalog, and the predetermined information in the ID card includes the user ID information.

According to the method in (12), when the information recording medium is applied to the commodity catalog in a catalog mail order selling, ordering of the commodity can be simply executed by using the telephone set merely by selectively reading the code image corresponding to the desired commodity by a predetermined reading device without necessity of the above-mentioned converter. And, a labor hour for newly confirming the user ID information or executing an inputting manipulation of the user ID information by a button is omitted.

(13) The method according to (8), wherein when the information recording medium is a commodity catalog describing to display various commodities referred when the originator orders a desired commodity to the recipient, the predetermined information includes:

a commodity designation information for individually selectively designating a desired commodity from a commodity group described on the commodity catalog; and information relating to various operations including an operation for designating at least one of starting an order and finishing the order to be executed to order the commodity to the recipient by the originator.

According to the method in (13), when the information recording medium is applied to the commodity catalog in a catalog mail order selling, ordering of the commodity can be simply executed by using the telephone set merely by selectively reading the code image corresponding to the desired commodity by a predetermined reading device without necessity of the above-mentioned converter. Simultaneously, an operation for ordering the commodity is simplified and an erroneous operation can be prevented.

(14) The method according to (8), wherein when the information recording medium is a commodity catalog describing to display various commodities referred when the originator orders a desired commodity to the recipient, the predetermined information includes a commodity designation information for individually selectively designating a desired commodity from a commodity group described on the commodity catalog, the code image further includes at least one of commodity sound information and commodity display information to confirm the commodity selectively designated by the commodity designation information of the same code image by at least one of aural and visual senses by the originator except the commodity designation information, and in the step of transmitting the predetermined information, transmitting the commodity designation information to the recipient and outputting at least one of the commodity sound information and commodity display information to the originator.

According to the method in (14), when the information recording medium is applied to the commodity catalog in a catalog mail order selling, ordering of the commodity can be simply executed by using the telephone set merely by selectively reading the code image corresponding to the desired commodity by a predetermined reading device without necessity of the above-mentioned converter. And, simultaneously, since the information such as sound, character, image, etc. for describing regarding the ordered commodity is immediately output from the selected code image, the orderer can confirm the read code image at the place that the read image is certainly the code image corresponding to the desired commodity and can execute the ordering work with safety.

Additional advantages and modifications will readily occur to those skilled in the art. Therefore, the invention in its broader aspects is not limited to the specific details, representative devices, and illustrated examples shown and described therein. Accordingly, various modifications may be made without departing from the spirit or scope of the general inventive concept as defined by the appended claims and there equivalents.

What is claimed is:

1. An information recording medium, comprising:

a portion recorded with a predetermined information to be transmitted through a telephone line as a code image to be optically read, said predetermined information being converted into a tone signal having a combination of two sound frequencies of a high frequency group and a low frequency group used to transmit a recipient's telephone number by an originator and being recorded as the code image corresponding to the converted tone signal; and a portion recorded with at least one of numerals, characters and symbols representative of a content of said predetermined information.

2. The medium according to claim 1, wherein said predetermined information includes a telephone number.

3. The medium according to claim 1, wherein when said information recording medium is a commodity catalog describing to display various commodities referred when the originator orders a desired commodity to the recipient, said predetermined information includes a commodity designation information for individually selectively designating a desired commodity from a commodity group described on said commodity catalog.

4. The medium according to claim 1, wherein when said information recording medium is a commodity catalog describing to display various commodities referred when the originator orders a desired commodity to the recipient, said predetermined information includes:
a commodity designation information for individually selectively designating a desired commodity from a commodity group described on said commodity catalog;
time and season information representative of at least one of a plurality of times and seasons; and
a plurality of different commodity attribute information set at each of the plurality of said time and season information of commodities selectively designated by said commodity designation information.

5. The medium according to claim 1, wherein when said information recording medium includes a commodity catalog describing to display various commodities referred when the originator orders a desired commodity to the recipient, and an ID card recording a user ID information for specifying an originator by a recipient in the case of ordering, said predetermined information in said commodity catalog includes a commodity designation information for individually selectively designating a desired commodity from a commodity group described on said commodity catalog, and
said predetermined information in said ID card includes the user ID information.

6. The medium according to claim 1, wherein when said information recording medium is a commodity catalog describing to display various commodities referred when the originator orders a desired commodity to the recipient, said predetermined information includes:
a commodity designation information for individually selectively designating a desired commodity from a commodity group described on said commodity catalog; and
information relating to various operations including an operation for designating at least one of starting an order and finishing the order to be executed to order the commodity to the recipient by the originator.

7. The medium according to claim 1, wherein when said information recording medium is a commodity catalog describing to display various commodities referred when the originator orders a desired commodity to the recipient, said predetermined information includes a commodity designation information for individually selectively designating a desired commodity from a commodity group described on said commodity catalog, and
said code image further includes at least one of commodity sound information and commodity display information to confirm the commodity selectively designated by said commodity designation information of the same code image by at least one of aural and visual senses by the originator except said commodity designation information.

8. An information transmission method, comprising the steps of:
optically reading a code image on an information recording medium, the code image including a predetermined information including at least one of numeral, character and symbol to be transmitted through a telephone line,
said predetermined information being converted into a tone signal having a combination of two sound frequencies of a high frequency group and a low frequency group used to transmit a recipient's telephone number by an originator and being recorded as the code image corresponding to the converted tone signal;
recovering the tone signal from the optically read code image; and
transmitting said predetermined information by outputting the recovered tone signal to the telephone line.

9. The method according to claim 8, wherein said predetermined information includes a telephone number.

10. The method according to claim 8, wherein when said information recording medium is a commodity catalog describing to display various commodities referred when the originator orders a desired commodity to the recipient, said predetermined information includes a commodity designation information for individually selectively designating a desired commodity from a commodity group described on said commodity catalog.

11. The method according to claim 8, wherein when said information recording medium is a commodity catalog describing to display various commodities referred when the originator orders a desired commodity to the recipient, said predetermined information includes:
a commodity designation information for individually selectively designating a desired commodity from a commodity group described on said commodity catalog;
time and season information representative of at least one of a plurality of times and seasons; and
a plurality of different commodity attribute information set at each of the plurality of said time and season information of commodities selectively designated by said commodity designation information, and
in the case of recovering, said attribute information corresponding to the time and season at the time of recovering is selected from a plurality of attribute information.

12. The method according to claim 8, wherein when said information recording medium includes a commodity catalog describing to display various commodities referred when the originator orders a desired commodity to the recipient, and an ID card recording a user ID information for specifying an originator by a recipient in the case of ordering, said predetermined information in said commodity catalog includes a commodity designation information for individually selectively designating a desired commodity from a commodity group described on said commodity catalog, and
said predetermined information in said ID card includes the user ID information.

13. The method according to claim 8, wherein when said information recording medium is a commodity catalog describing to display various commodities referred when the originator orders a desired commodity to the recipient, said predetermined information includes:
a commodity designation information for individually selectively designating a desired commodity from a commodity group described on said commodity catalog; and
information relating to various operations including an operation for designating at least one of starting an order and finishing the order to be executed to order the commodity to the recipient by the originator.

14. The method according to claim 8, wherein when said information recording medium is a commodity catalog describing to display various commodities referred when the originator orders a desired commodity to the recipient, said predetermined information includes a commodity designation information for individually selectively designating a desired commodity from a commodity group described on said commodity catalog, the code image further includes at least one of commodity sound information and commodity display information to confirm the commodity selectively designated by said commodity designation information of the same code image by at least one of aural and visual senses by the originator except said commodity designation information, and in said step of transmitting said predetermined information, transmitting said commodity designation information to the recipient and outputting at least one of said commodity sound information and commodity display information to the originator.

* * * * *